United States Patent

Corey

[15] 3,677,086
[45] July 18, 1972

[54] MEASURING SYSTEM FOR A FLUID FLOW STREAM

[72] Inventor: Victor B. Corey, Bellevue, Wash.
[73] Assignee: Sundstrand Data Control, Inc.
[22] Filed: June 10, 1970
[21] Appl. No.: 45,017

[52] U.S. Cl. ............................... 73/205 R, 73/189, 137/81.5
[51] Int. Cl. .......................................................... G01p 5/00
[58] Field of Search ...................... 73/189, 194 R, 212, 205; 137/81.5

[56] References Cited

UNITED STATES PATENTS 3,364,741  1/1968  Hickox ..................................... 73/189

Primary Examiner—Jerry W. Myracle
Attorney—Hofgren, Wegner, Allen, Stellman & McCord

[57] ABSTRACT

An apparatus for determining a characteristic, as velocity or direction, of a fluid flow stream. Fluid sensors generate signals which are differentially compared to produce an error signal representative of the amount of movement, for the sensors or for a fluid stream generator, which is necessary to null the system. A servomechanism produces the nulling movement in response to the error signal. The amount of movement also generates a positional signal indicating the low frequency component or steady state characteristic of the fluid flow stream. A signal adder combines the positional signal with the error signal, containing a high frequency component, to provide an indication of the instantaneous fluid characteristic.

9 Claims, 3 Drawing Figures

Inventor:—
Victor B. Corey,
By Hofgren, Wegner, Allen, Stellman & McCord
Attys.

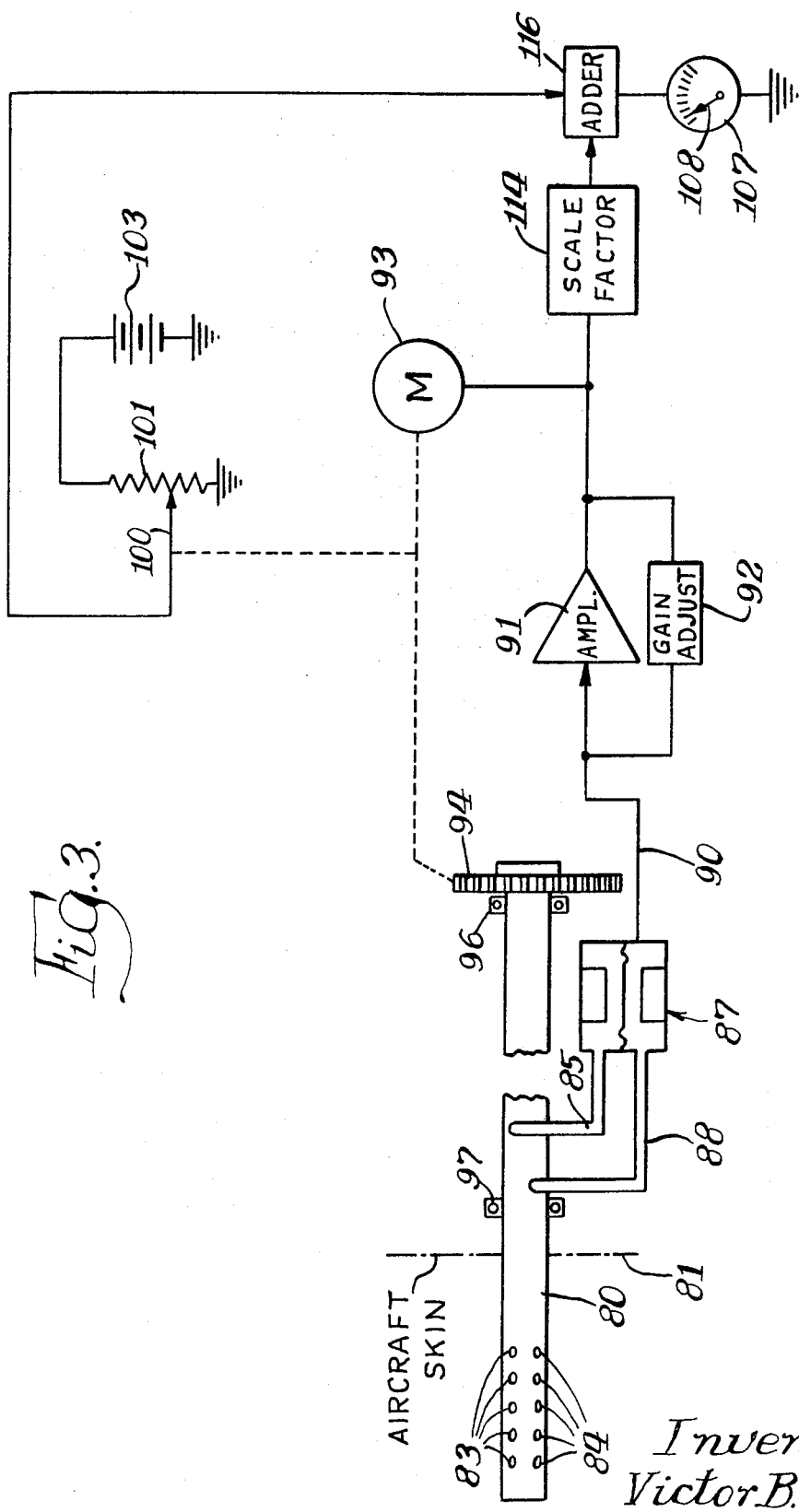

MEASURING SYSTEM FOR A FLUID FLOW STREAM

BACKGROUND OF THE INVENTION

This invention relates to a measuring system for a relatively moving fluid flow stream, and more particularly to a system for measuring an instantaneous characteristic of a fluid flow stream which has both slowly changing and rapidly changing components.

Prior apparatus for measuring the velocity or direction of a fluid flow stream typically use servomechanisms to drive an element toward a null condition. The position of the element is used to provide a measure of the velocity or direction of the fluid flow stream. While such systems provide the advantages of a closed loop measurement, the system is accurate only when the element is at a null position, and hence the accuracy is limited by the time response of the servomechanism.

An example of a typical measuring system is an aircraft angle of attack transducer. A probe extending through the aircraft skin and into the airstream has two parallel rows of pressure ports which sense the ram jet pressure of the airstream. A differential pressure servo amplifier rotates the probe until the ram jet pressures at both rows of ports are equal. The rotational position of the probe is a direct measure of the airstream direction, which in turn can be directly related to the angle of attack of the aircraft. However, when the angle of attack changes rapidly, the indicated angle of attack lags the actual angle of attack, and a new steady state angle of attack is not correctly indicated until the servomechanism has had sufficient time to rotate the probe to a new position.

SUMMARY OF THE INVENTION

In accordance with the present invention, the instantaneous direction or velocity of a fluid flow stream is determined by apparatus which retains the advantages of a closed loop servomechanism. The apparatus may be used in any system in which a characteristic of a fluid flow stream can be measured by movement of an element. The measured characteristic may be fluid direction, velocity, pressure, or any other fluid characteristic for which suitable sensors are available.

One object of the present invention is to provide apparatus for measuring an instantaneous characteristic of a fluid flow stream. Illustratively, the characteristic may be the direction, velocity, or pressure of the fluid stream, or other characteristic which can be measured by a plurality of devices, at least one of which is relatively movable.

Another object of the present invention is to provide a fluid measuring apparatus in which devices for determining a fluid characteristic are relatively movable by a servomechanism driven by differentially compared signals from fluid sensors. A signal summing means combines a signal representing the position of the servomechanism with the output of the differentially compared signals in order to indicate an instantaneous characteristic of the fluid flow stream.

A further object of this invention is the provision of a fluid flow stream measuring apparatus which may be added to existing measuring systems with a minimum of modification, and which is usable both with systems generating local effects deflected by the moving fluid flow stream and with systems dependent solely upon the moving fluid flow stream for measurement purposes.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

BRIEF DESCRIPTION OF THE DRAWINGS

FIG. 3 is a schematic diagram of the invention as applied to a fluid stream direction determining apparatus operating upon the ram jet principle.

DESCRIPTION OF THE PREFERRED EMBODIMENT

Figure 1:
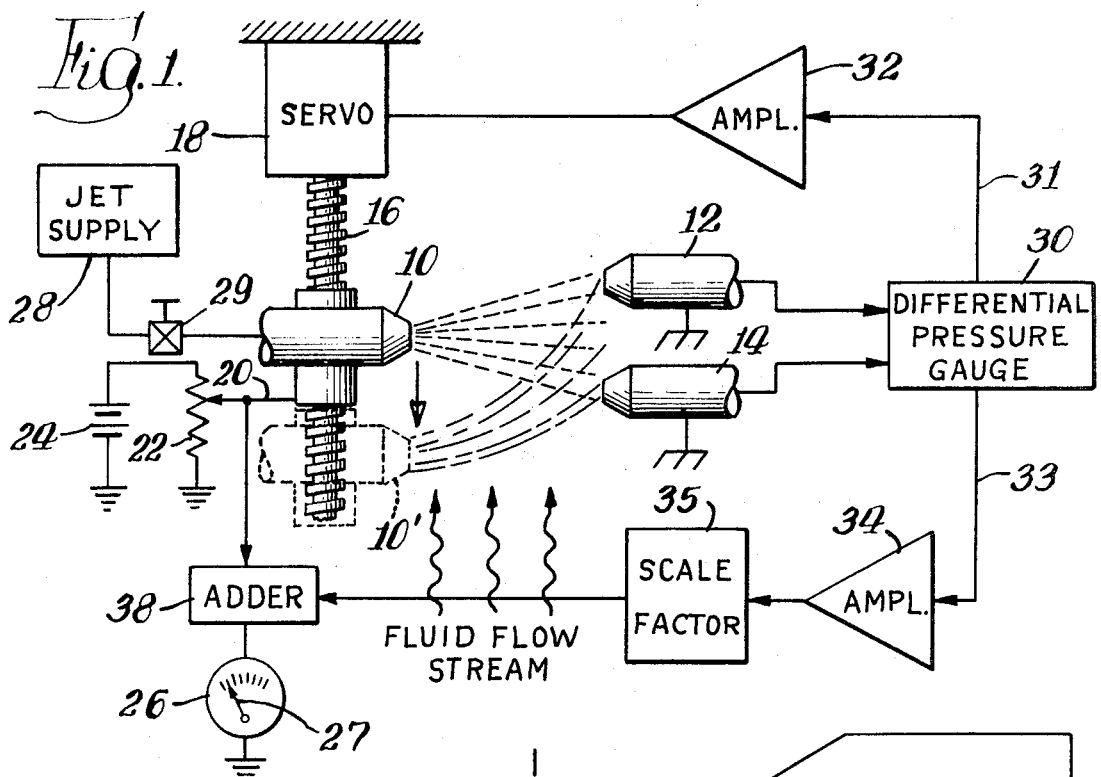
FIG. 1 is a schematic diagram illustrating the invention as applied to a fluid stream velocity detection apparatus.
Figure 2:
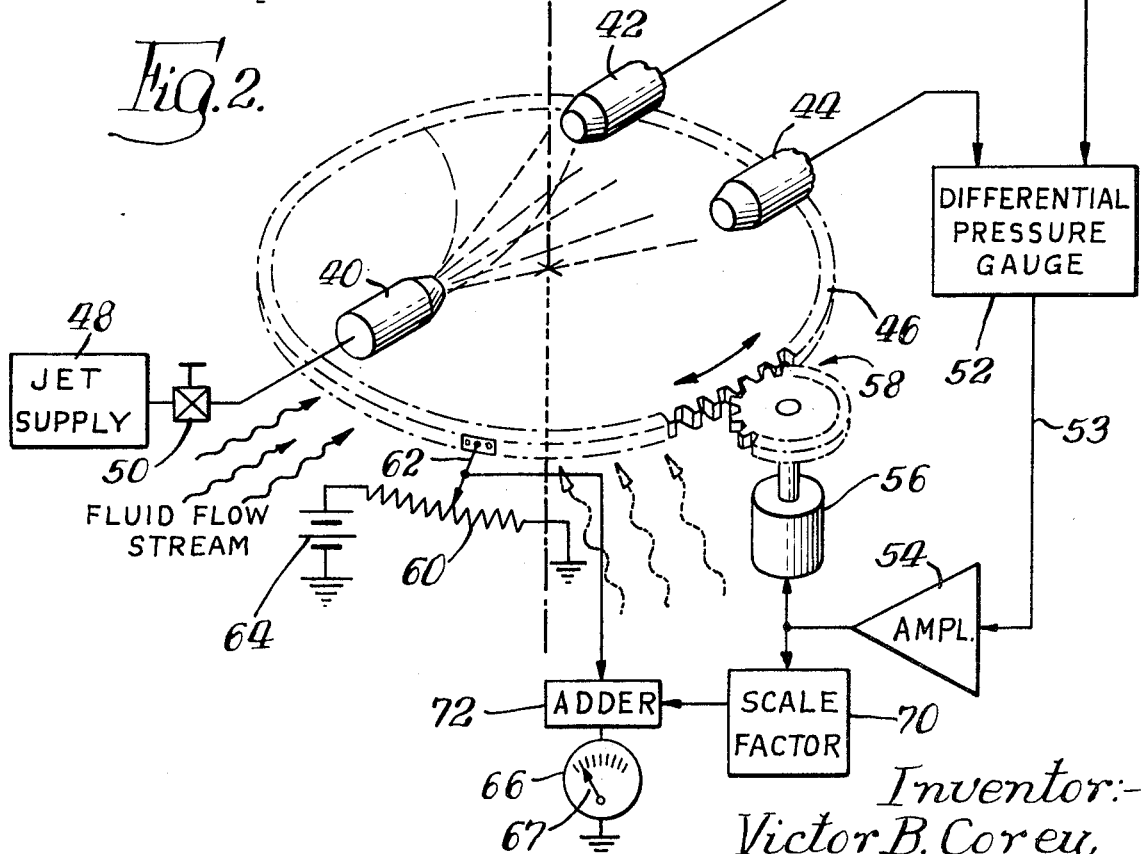
FIG. 2 is a schematic diagram illustrating the invention as applied to a fluid stream direction determining apparatus.

In the drawings, the measuring apparatus is illustratively shown in combination with systems for measuring airstream velocity and direction. In FIGS. 1 and 2, airstream velocity and direction, respectively, are determined by sensing the deflection of transmissions exposed to the airstream. As will appear, the transmissions may be in the form of a fluid jet stream, or an acoustic wave. In FIG. 3, airstream direction is determined by the difference in ram jet pressure on a plurality of receivers located in the path of the airstream.

Turning to FIG. 1, the present invention is illustrated in combination with a fluid flow stream velocity measuring apparatus of the type disclosed in my copending application "-Fluidic Sensor For Fluid Stream Velocity," filed on even date herewith, Ser. No. 45,029, and assigned to the assignee of this invention, to which reference should be made for a specific disclosure of the principle and details of operation of the apparatus. The apparatus will be described herein only insofar as it is necessary to an understanding of the present invention.

A supply jet nozzle 10 is axially disposed opposite two receiver nozzles 12 and 14, and is initially positioned along an axis midway between the receiver nozzles 12 and 14. The nozzle 10 is movably mounted on a threaded shaft 16 which, when rotated by a servo drive means 18, causes the nozzle 10 to be displaced laterally along the axial direction of the threaded member 16. Also connected to the nozzle 10 structure is an arm 20 of a potentiometer having a resistance 22 connected across a voltage supply means, such as a battery 24. As potentiometer arm 20 is moved relative to resistance 22, the voltage at potentiometer arm 20 is varied in direct proportion to the displacement of the nozzle 10. In my copending application, this voltage is directly coupled to an indicator 26 to cause a needle 27 thereon to deflect and provide an indication of the velocity component of the fluid flow stream, as will appear.

A jet supply means 28 furnishes a continuous flow of fluid, which preferably is the same as the fluid in the flow stream so as to prevent contamination or other problems, to nozzle 10 which directs the fluid transmissions across the path of the fluid flow stream towards the detectors 12 and 14. A throttle valve 29 is located in the tubulation connecting the supply 28 to the nozzle 10 so that the flow rate of the jet stream may be selectively regulated.

Receivers 12 and 14 are pressure sensitive devices which each generate a signal having a value dependent upon the pressure sensed at the nozzle opening therein. The pair of signals are connected to a differential pressure gauge 30 which provides an error signal, on a line 31, having a value proportional to the difference in fluid pressure between the nozzles 12 and 14. This error signal is coupled to an amplifier 32 where it is amplified and fed to the servomechanism 18 which, by rotation of the shaft 16, causes the nozzle 10 to be displaced along the axis of the shaft.

The above described components are those disclosed and claimed in my before identified copending application, and form a velocity indicator for the fluid flow stream. When the nozzle 10 is in the position shown and there is no incident fluid flow stream, as when the apparatus is mounted to a support vehicle which is at rest, the fluid transmissions from the nozzle 10 are equally directed to both of the nozzles 12 and 14, resulting in equal pressures and a zero volt error signal on line 31. Upon subjecting the transmissions to a fluid flow stream which intersects it in a direction transverse to its axis, the jet stream is diverted and equal pressures no longer appear in the receiver nozzles 12 and 14. The differential pressure produces an error signal which drives the servomechanism 18 to rotate threaded shaft 16 and displace the nozzle 10 in a direction which tends to equalize the pressure. Movement of the nozzle 10 continues until the receivers 12 and 14 detect equal fluid pressures. As explained in the before identified application, it can be shown that the new position 10' of the transmitter nozzle is directly related to the velocity of a fluid stream flowing normal to the jet stream emitted by the transmitter. Since the voltage on arm 20 is directly proportional to this position, the meter 26 may be calibrated directly in terms of velocity, thereby indicating the velocity of the incident fluid flow stream.

The time response of servomechanism 18 limits the use of the above described apparatus to measuring slowly changing or low frequency velocity components of a fluid flow stream. In order to measure the instantaneous velocity of the fluid flow stream, the additional apparatus in FIG. 1 is used to sum a high frequency velocity component with the existing low frequency velocity component. While a separate high frequency component could be generated, applicant simplifies the system by using a signal already in existence in the above described apparatus, and which includes information as to rapidly changing components of the fluid stream, namely the error signal from differential gauge 30. More particularly, the error signal is also coupled over a line 33 to an amplifier 34, and thence through a scale factor network 35 to a signal adder 38. The positional signal from potentiometer 20 is also coupled to adder 38, which adds it to the scaled error signal to form a single summed signal coupled to indicator 26.

When the fluid flow stream velocity has damped to a steady state condition, transmitter 10 is located at a new position 10' which causes a given voltage at arm 20. Since equal pressures are being received at receivers 12 and 14, no error signal is generated and hence no additional voltage is added due to differential gauge 30. Assuming the fluid flow now increases to a new fixed velocity, a differential pressure is sensed and, before servomechanism 18 can respond thereto, the pressure difference error signal is amplified, scaled, and is summed in adder 38 with the positional signal to indicate at meter 26 the increased instantaneous velocity of the flow stream. As servomechanism 18 responds to the pressure difference, the jet nozzle 10 is moved further from the null position, increasing the signal at arm 20. However, this causes the error signal to decrease, so that the sum of the two signals remains constant. As the servomechanism nulls, the error signal on line 33 goes to zero, and the signal from wiper arm 20 alone provides the indication of the velocity of the fluid flow stream.

Certain modifications may be made in the velocity determining apparatus without changing the manner in which the present invention is utilized therewith. For example, in place of the translatable jet nozzle 10, the transmitter may remain fixed and the pair of receiver nozzles 12 and 14 may be displaced by a servomechanism. In such a case, the potentiometer arm would be connected to move with the receiver nozzles.

In FIG. 2, the invention is shown in combination with apparatus for measuring the direction of a fluid flow stream. Direction determining apparatus of this type is disclosed in my copending application "Fluidic Direction and Velocity Detection Apparatus," filed on even date herewith, Ser. No. 45,016, and assigned to the assignee of the present invention. For a more complete description of the theory and operation of the system, along with possible alternatives, reference should be made to the above application, which will be described herein only insofar as it is necessary to an understanding of the present invention.

A jet supply nozzle 40 is fixedly mounted relative to a pair of receiver nozzles 42 and 44, the three devices being mounted on a platform 46 which is relatively movable with respect to the fluid flow stream. Connected to jet nozzle 40 through suitable tubulation is a jet supply source 48, the flow rate of which may be regulated by a valve 50. The receiver nozzles 42 and 44 are similar to the nozzles 12 and 14 in FIG. 1, and are connected to a similar differential pressure gauge 52 to produce an output error signal, on a line 53, proportional to the difference in pressure sensed at nozzles 42 and 44. The error signal is amplified by an amplifier 54 and coupled to a servomechanism 56 for rotating the platform 46 by means of a drive gear mechanism 58.

To monitor the fluid flow direction, a potentiometer 60 has an arm 62 connected for movement with platform 46. Potentiometer 60 is connected across a DC voltage source, as a battery 64. The voltage signal at arm 62 is coupled to a meter 66 having a needle 67 deflected in proportion to the signal input, in the same manner as meter 26 in FIG. 1.

The above described apparatus of FIG. 2 is that disclosed in my last identified copending application. In operation, the valve 50 is opened to form a fluid jet stream which impinges equally on receiver nozzles 42 and 44 when the direction of the fluid flow stream is parallel with the direction of the jet stream transmissions. However, should unequal pressures be detected in the receivers 42 and 44, as is the case when the fluid flow stream has a directional component transverse to the direction of transmissions, as shown by the dashed lines, the jet stream is diverted and causes differential gauge 52 to produce an error signal. The servo 18 rotates platform 46, counterclockwise for the new fluid direction illustrated in dashed lines in FIG. 2, until equal pressures are sensed at nozzles 42 and 44. At this time, the jet stream is aligned directly with the incident fluid flow stream.

In accordance with the present invention, the additional apparatus shown in FIG. 2 is provided to indicate the instantaneous direction of the fluid flow stream. The amplified error signal is coupled to a scale factor network 70 which has an output coupled to an adder 72. The adder 72, like the adder 38 in FIG. 1, combines the positional or low frequency component signal from arm 62 with the error or high frequency component signal. The summation of the signals is coupled to meter 66 in order to provide an instantaneous indication of the direction of the fluid flow stream.

Modifications may be made in the direction determining apparatus without changing the disclosed instantaneous measurement system. If desired, the apparatuses of FIGS. 1 and 2 may be combined into a single combined direction and velocity indicating system, in which the servo 56 of FIG. 2 is used to rotate the velocity determining apparatus of FIG. 1 so as to maintain the jet transmissions therefrom at all times perpendicular to the direction of the incident fluid flow stream. While the systems of FIGS. 1 and 2 have special advantages when measuring fluid flow streams of low velocities, different apparatus may be used when the fluid flow stream velocity is of greater magnitude. For example, the transmissions, here in the form of a fluid jet stream, may be in the form of an acoustic wave. Such a system is disclosed in my copending application "Direction and Velocity Determining Apparatus," Ser. No. 809,837, filed Mar. 24, 1969, and assigned to the same assignee of the present invention.

In FIG. 3, the present invention is applied to a direction determining apparatus operating on a different theory than that shown in FIG. 2. The apparatus of FIG. 3 employs the ram jet principle, and is commonly used to detect airstream direction relative to an air frame reference, i.e., an angle of attack transducer. As illustrated, the apparatus consists of a probe 80 which extends longitudinally beyond the skin 81 of the aircraft. Probe 80 includes a parallel row of pressure ports 83, and a second parallel row of pressure ports 84, spaced 90° from the ports 83. The two parallel rows form equal angles from the airflow stagnation point to sense the differential ram jet pressure against the ports as the aircraft moves through the airstream. The ports 83 are connected through a tubing 85 to a differential pick-off 87. The second row of ports 84 are connected through a tubulation 88 to the differential pick-off 87. The output from device 87, as is well known, is an error signal, on a line 90, which is proportional to the difference in pressure between ports 83 and ports 84. The signal is amplified by an amplifier 91, having an adjustable gain control 92, and coupled to a servomechanism motor 93 which by means of gearing 94 repositions or rotates the probe 80 within bearings 96, 97 to a balanced pressure position.

The motor 93 also causes a wiper arm 100 of a potentiometer 101 to move an amount proportional to the movement necessary to reposition the probe 80. The resistance 101 of the potentiometer is coupled across a source of voltage, such as a DC battery 103, thereby generating a voltage signal on arm 100 which is coupled to an indicating meter 107 and to units for controlling the aircraft.

In accordance with the present invention, the error signal to servo motor 93 is also coupled to a scale factor network 114 to produce a scaled output connected to an adder network 116. The other input of adder 116 is the positional signal from arm 100. The adder 116, operating in the same manner as the adder 72 in FIG. 2, sums the positional signal with the scaled error signal in order to provide an output signal to meter 107 which indicates the instantaneous direction or angle of attack of the airstream. Thus, it will be seen that the invention can also be used when the devices for determining the characteristic of fluid consists of only a pair of elements fixed with respect to each other but movable with respect to the fluid stream. Other modifications will be apparent to those skilled in the art.

I claim:

1. Apparatus for measuring a characteristic of a fluid flow stream, comprising:
    device means for generating a pair of signals differentially influenced by said fluid flow stream and by movement of at least part of said device means, means movably mounting said part of said device means for movement to different positions representing different values of said fluid characteristic;
    differentially responsive means coupled to said device means for generating an error signal having a value proportional to the difference between the signals from said device means;
    servo means coupled to said differentially responsive means for moving said movable part of said device means to tend to null said error signal;
    position responsive means for generating a positional signal which represents the instantaneous position to which said servo means has moved said movable part of said device means; and
    summing means for combining said error signal and said positional signal to provide a measurement of the instantaneous characteristic of said fluid flow stream.

2. The apparatus of claim 1 wherein said device means comprises transmitter means and at least two receiver means, said transmitter means emitting transmissions along an axis exposed to said fluid flow stream, said transmission deviating in direction when the fluid flow stream is incident thereon, said receiver means being axially spaced from said transmitter means for detecting said transmissions and each generating a signal varying as the transmissions deviate in direction from said axis, said servo means changing the relative spacing of said transmitter means and said receiver means.

3. The apparatus of claim 2 for measuring the velocity characteristic of the fluid flow stream, wherein said transmitter means emits transmissions along an axis generally perpendicular to the direction of the fluid flow stream, said servo means moving one of said transmitter means or said receiver means relative to the other so as to change the relative spacing therebetween, whereby said summing means provides a measurement of the instantaneous velocity of said fluid flow stream.

4. The apparatus of claim 3 wherein said position responsive means includes potentiometer means having an arm coupled to said one means for changing a resistance of the potentiometer in proportion to movement of the one means, electrical supply means coupled to said resistance to cause the voltage at said arm to form said positional signal, said summing means including a meter for indicating the total signal coupled thereto, and a signal adder having inputs coupled to said potentiometer arm and said differentially responsive means to provide a measurement of the instantaneous velocity of the fluid flow stream.

5. The apparatus of claim 2 for measuring the directional characteristic of the fluid flow stream, wherein said transmitter means emits transmissions along an axis which is to be maintained parallel to said fluid flow stream, platform means fixedly mounting said transmitter means relative to said receiver means, said servo means rotating said platform means to positions which maintain said fluid flow stream parallel to said transmissions, thereby providing a measurement of the instantaneous direction of said fluid flow stream.

6. The apparatus of claim 5 wherein said summing means includes a scale factor network coupled to said differentially responsive means for scaling said error signal which represents a high frequency directional component of said fluid flow stream.

7. The apparatus of claim 2 wherein said transmissions consist of a jet stream of fluid of the same composition as the fluid of said fluid flow stream, said receiver means being responsive to the pressure of the fluid incident thereagainst.

8. The apparatus of claim 1 wherein said device means comprises at least a pair of pressure sensitive means each generating a signal in proportion to the ram pressure of said fluid flow stream thereagainst, probe means mounting said pressure sensitive means fixed with respect to each other, bearing means mounting said probe means movable with respect to said fluid flow stream, said servo means moving said probe means to balance the ram pressures at said pressure sensitive means.

9. The apparatus of claim 8 wherein said position responsive means includes a signal generating means for producing a signal having an amplitude dependent upon the position of a movable element, means coupling said movable element to said servo means for movement with movement of said probe means, and said summing means includes a scale factor network for at least one of said signals.

* * * * *